United States Patent Office 3,778,434
Patented Dec. 11, 1973

---

3,778,434
9 ALPHA, 11-DIMETHYL-SUBSTITUTED STEROIDS
Robert V. Coombs, Chatham, N.J., assignor to
Sandoz-Wander, Inc., Hanover, N.J.
No Drawing. Filed Apr. 20, 1972, Ser. No. 245,968
Int. Cl. C07c 173/00
U.S. Cl. 260—239.55 C          27 Claims

ABSTRACT OF THE DISCLOSURE

The compounds are 9α,11-dimethyl-substituted steroids of the estrane-type, e.g. 9α,11-dimethyl-17α-ethynylestra-4-en-17β-ol-3-one. The compounds are useful as pharmaceuticals.

---

This invention relates to steroidal compounds, and more particularly to 9α,11-dimethyl-substituted-estranes, to the preparation of such compounds and to intermediates in the preparation of such compounds, as well as to compositions containing such compounds and to the use of such compositions.

The compounds of the invention may be conveniently represented by the structural Formula I:

(I)
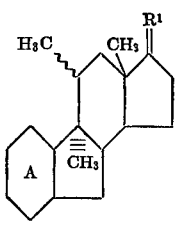

wherein $R^1$ is oxo, or

wherein
$R^a$ is a hydrogen atom, methyl, or ethynyl; and
$R^b$ is a hydrogen atom, or alkanoyl having from 2 to 4 carbon atoms, e.g. acetyl, propionyl and butyryl, including isomeric forms where they exist, and is preferably unbranched; and ring A has the structure

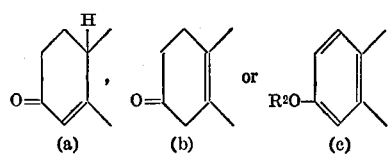

wherein
$R^2$ is a hydrogen atom, alkyl having from 1 to 4 carbon atoms, e.g. ethyl, methyl, propyl or butyl, including isomeric forms where they exist and is preferably unbranched, or alkanoyl having from 2 to 4 carbon atoms, e.g. as described above; provided that when ring A is of type (a) or (b) then $R^1$ is not oxo or

Accordingly, Compounds I include 3 classes of compounds depending upon the structure of ring A present, i.e. Compounds Ia, Ib or Ic; wherein $R^1$, $R^2$ and $R^b$ are as defined above, and $R^a$ is methyl or ethynyl.

(Ia)
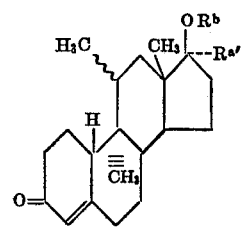

(Ib)
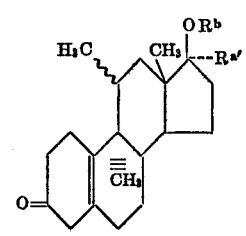

(Ic)
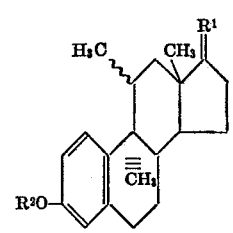

Compounds of Formula Ic, are obtainable by a multistep process. The process for the preparation of a Compound Ic wherein $R^1$ is oxo and $R^{2'}$ is the same as $R^2$, as defined above, but is other than a hydrogen atom or alkanoyl, i.e. a Compound Ic1, is conveniently represented by Reaction Scheme A below; wherein, Kt is a ketal group which is suitable for masking an oxo group, such as

wherein each $R^3$ is methyl, or they may be joined to form a short alkylene chain, e.g. having 2 or 3 carbon atoms, i.e. ethylene or n-propylene:

Reaction Scheme (A)
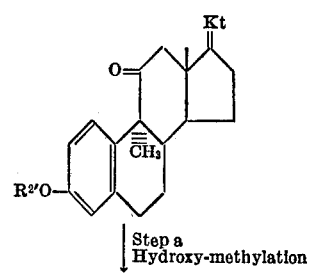

Step a
Hydroxy-methylation (B)
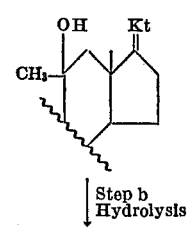

Step b
Hydrolysis

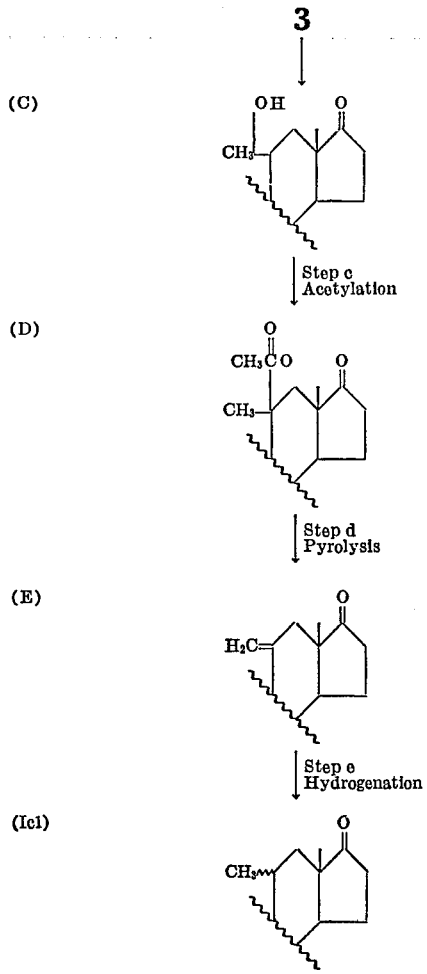

In the preparation of a Compound Ic1, the starting materials, i.e. Compounds A, are known and their preparation is described in the literature, e.g. Belgian Patent 753,779, or where not known, they may be prepared in a manner analogous to that for preparing the known compounds.

Step $a$, the introduction of a hydroxy and a methyl group at the 11-position, is achieved by reacting a Compound A with a metallo-organic reagent bearing a methyl group, e.g. a Grignard reagent, under conditions conventionally employed in carrying out a Grignard reaction. The selection of the particular reagent and reaction conditions are not critical and are within the skill of persons skilled in the art. For example, a methyl-active metal reagent may be used, wherein the active metal is an alkali metal such as lithium, sodium or potassium or a polyvalent metal, such as aluminum, or magnesium bromide or iodide. Such reagents are well-known and many are commercially available.

Step $a$ involves two stages, i.e. a condensation stage which results in the formation of an intermediate which is the 11-methyl-11-O-metallic salt of the resulting Compound B, the metallic cation being contributed by the metallo-organic reagent. The intermediate is then hydrolyzed to yield the free 11-hydroxy compound, i.e. the Compound B. The reaction may be conveniently carried out, e.g. at a temperature of from about −80 to +60° C. and preferably from about −50 to +30° C. in an anhydrous aprotic solvent or medium suitable for reactions involving a metallo-organic reagent, e.g. an ether, such as tetrahydrofuran. The hydrolysis of the reaction product may be carried out in the manner conventionally used in hydrolyzing Grignard adducts, for example, in an aqueous medium, e.g. by water or a highly concentrated aqueous solution of ammonium chloride or dilute aqueous acid or alkaline solution.

In Step $b$ the ketal group of Compound B is cleaved by hydrolysis under aqueous acid conditions. Step $b$ should be carried out under relatively "mild" acid conditions, e.g. in acid media with pH value above about 3 and preferably between 3 and 5 for a prolonged period, e.g. for a period of from about ¼ to 3 hours. Organic acid, such as oxalic acid or acetic acid may be used to provide the acidic conditions. Step $b$ may be carried out at temperatures of, e.g. from about 0° to 100° C., preferably from about 15° to 50° C. An inert water-miscible solvent may be employed, such as a lower alkanol, e.g. methanol. Where the acid reactant is liquid it may be employed in excess to serve as solvent e.g. acetic acid. Co-solvents may also be used.

Step $c$ involves acetylating the 11-hydroxy function of a Compound C under conditions which are not strongly acidic. For example, the acetylation may be carried out using calcium hydride, held in acetic anhydride at temperatures of from about 80° to 150° C., preferably at reflux; no solvent being required as the acetic anhydride can serve as solvent.

In Step $d$, Compound D is submitted to pyrolyzing conditions whereby the 11-methyl, 11-acetoxy system thereof is converted to an 11-methylene function, yielding a Compound E. The pyrolysis may be achieved by heating a Compound D at e.g. about 225° to 260° C. at reduced pressure.

In Step $e$, the conversion of the 11-methylene function of a Compound E to a methyl group to obtain the corresponding Compound Ic1, is achieved by hydrogenation. The hydrogenation may be carried out in the conventional manner, e.g. employing an inert solvent or medium, such as a lower alkanol, e.g. methanol, with agitation at moderate temperatures, e.g. at from about 15° to 60° C., preferably at about 20° to 30° C., in a hydrogen atmosphere in the presence of a noble metal catalyst which may be finely divided on a carrier; 5% palladium on charcoal (carbon) being preferred.

As will be appreciated, Compounds Ic1 may be converted to other Compounds Ic by conventional means. The 3-alkoxy function of a Compound Ic1 may be cleaved by conventional means for cleaving an ether linkage to obtain a Compound Ic wherein $R^2$ is a hydrogen atom. For example, the cleavage may be carried out by heating the 3-alkoxy-compound with pyridine·HCl at from about 100° to 200° C., preferably at about 180° C. The resulting 3-hydroxy-compound may then be alkanoylated by conventional means to obtain a Compound Ic wherein $R^2$ is an alkanoyl group.

Compounds Ic1 may also serve as intermediates for Compounds Ia or Ib, as may be conveniently represented by Reaction Scheme B, which follows; wherein $R^{2'}$ and $R^{a'}$ are as defined above, and $R^{b'}$ is the same as $R^b$, but is other than a hydrogen atom, i.e. it is an alkanoyl group; and Compounds Ia1 and Ib1 are the same as Compounds Ia and Ib, wherein $R^b$ is a hydrogen atoms:

REACTION SCHEME B

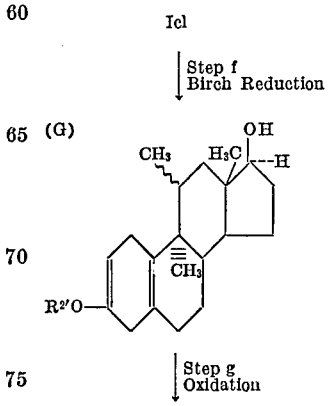

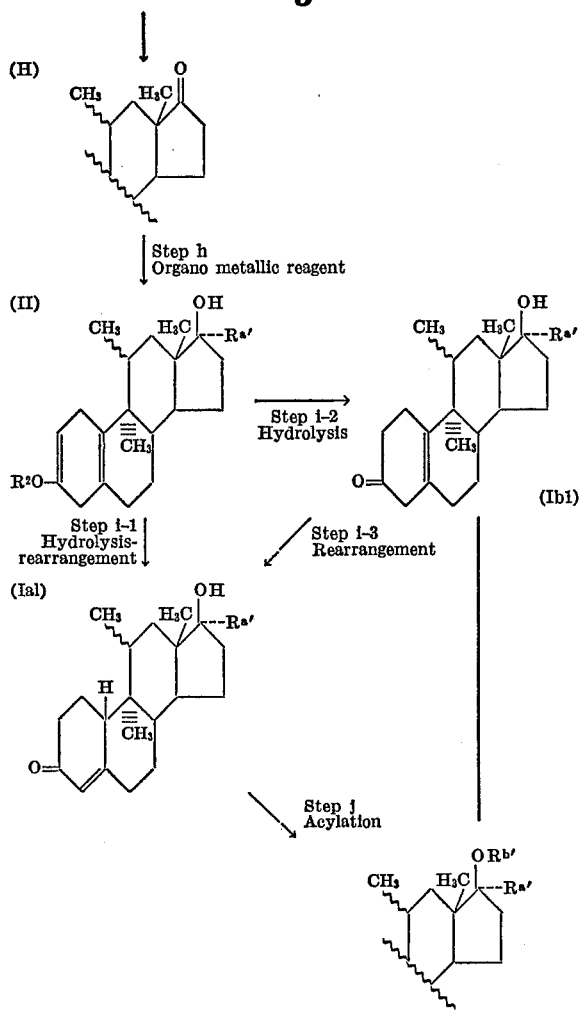

In Step $f$, a Compound Ic1 is converted to its corresponding Compound G by reducing the aromatic unsaturation, i.e. the 1,3,5(10)-double bond system of ring A, to a 2,5(10)-dien system, and also reducing the 17-oxo function. This may be accomplished by employing the so-called Birch reduction, which broadly involves use of a light metal, e.g. lithium, and tert.-butanol, in liquid ammonia at reduced temperatures (sufficient to maintain the ammonia in a liquid state); as the ammonia can serve as the reaction medium, no solvent is required, but can be used, e.g. benzene or tetrahydrofuran.

In Step $g$, the 17-hydroxy function of a Compound G is oxidized to an oxo function, yielding the corresponding Compound H. The oxidation may be accomplished by those means conventionally used for oxidizing a secondary aliphatic hydroxy to a carbonyl, which do not involve strongly acidic conditions, for example, by employing the so-called Oppenauer oxidation, which broadly involves oxidizing a hydroxy function in the presence of a metallic alkoxide and a ketone, e.g. aluminum isopropoxide and 2-butanone, e.g. at temperatures of about 60° to 130° C., in an inert organic solvent, such as benzene, toluene and the like.

In Step $h$, a 17-oxo compound (a Compound H) is converted to its corresponding 17β-hydroxy-17α-methyl or ethynyl-substituted analog, i.e. a Compound II.

In preparing a Compound II (Step $h$) a metallo-organic reagent bearing the desired group is employed. A 17α-methyl, 17β-hydroxy compound can be obtained by adapting the procedure described for Step $a$, above. A 17α-ethynyl, 17β-hydroxy substituted Compound II, may be prepared in a manner analogous to that of Step $a$. A particularly convenient method of preparing a Compound II wherein $R^a$ is ethynyl is to use as the metallo-organic reagent lithium acetylide/ethylenediamine complex in dimethyl sulfoxide or dimethyl-acetamide, under the conditions of Step $a$.

A Compound II may be converted to its corresponding Compound Ia (Step $i$-1) by hydrolysis-rearrangement wherein the 3-alkoxy-2,5(10)-dien-system is converted to a 3-oxo-4-en-system. Such conversion may be accomplished by employing the aqueous acidic conditions of Step $b$ for a prolonged period, e.g. over 3 hours. Alternatively, Step $i$-1 may be carried out under "vigorous" aqueous acidic conditions, i.e. at about pH value of 3 or lower, e.g. between 1 and 2; the acidic conditions being provided by, e.g. oxalic acid, p-toluene sulfonic acid or a mineral acid, such as hydrochloric acid. The conversion is accomplished under such "vigorous" conditions in a relatively short time, e.g. less than 3 hours. Treatment of a Compound II with the "mild" acidic conditions of Step $b$ for a relatively short period of time (Step $i$-2) yields the corresponding Compound Ib. A Compound Ib can be converted to its corresponding Compound Ia by rearrangement (Step $i$-3). Step $i$-3 may suitably be carried out by subjecting a Compound Ib to acid or basic conditions. The process may be carried out under either aqueous or non-aqueous conditions.

Basic rearrangement may suitably be effected in an inert organic solvent, such as dioxane, methanol or ethanol. A suitable reaction temperature is from 20° to 120° C., conveniently from 20° to 30° C., or at the reflux temperature of the reaction mixture. Suitable reaction times vary, for example from ¼ hr. to 6 hrs. Aqueous basic conditions may conveniently be obtained by using, for example, aqueous sodium or potassium hydroxide, preferably at a concentration of from 0.01 N to 2 N. Where non-aqueous conditions are employed, the basic conditions are conveniently provided by using an alkali metal lower alkoxide, e.g. sodium methoxide.

Acid rearrangement may suitably be carried out under the conditions described above in connection with Step $i$-1. However, the aqueous nature of the conditions, essential in Step $i$-1, are not essential in the rearrangement and, accordingly, the solvent need not be water-miscible.

In Reaction Scheme B, Step $h$ is shown to be applied to a Compound H. However, where a Compound Ic wherein $R^1$ is 17β-hydroxy, 17α-methyl or ethynyl is desired, a Compound Ic1 may be treated in a manner analogous to Step $h$ to obtain such a compound. A Compound Ic wherein each of $R^a$ and $R^b$ is a hydrogen atom may be obtained by reducing the 17-oxo function of a Compound Ic1. The reduction may be accomplished by treatment in the conventional manner with a light metal or complex hydride, e.g. $NaBH_4$ or $LiAlH_4$ under conditions conventionally applied in carrying out such a reduction in an aprotic organic medium essentially free of water, e.g. ethanol or ethanol-methylene chloride for $NaBH_4$ and tetrahydrofuran for $LiAlH_4$.

In Reaction Scheme B, acylation of Compounds Ia1 and Ib1 is shown to yield the corresponding compounds wherein $R^b$ is alkanoyl, as defined above. However, Compounds Ic wherein $R^2$ is a hydrogen atom, as well as Compounds Ia, Ib or Ic wherein $R^b$ is a hydrogen atom, i.e. Compounds I bearing a hydroxy group at any of positions 3- and 17-, may be acylated to obtain those Compounds I wherein any of $R^2$ and $R^b$ is alkanoyl as defined above (Step $j$).

The Step $j$ may be effected by processes known per se for the acylation of steroid alcohols. With respect to compounds of Class Ic having two hydroxy groups, it will be noted that, a hydroxy group at the 3-position is phenolic and a hydroxy group at the 17β-position is secondary or tertiary. As one skilled in the art will be aware, the ease of acylation is phenolic>secondary>tertiary, and the ease of re-saponification is clearly phenolic>secondary>tertiary. Accordingly, acylating agents and the stringency of acylating conditions can be chosen depending on the degree of acylation required employing conventional techniques. Suitable acylating agents for the 3-position include acids, acyl halides and acid anhydrides of formulae acyl-OH, acyl-Hal and (acyl)₂O, respectively, therein acyl is alkanoyl as defined above, Hal signifies bromine or chlorine, and mixtures thereof. Where the desired acyl moiety is acetyl, a preferred acylating agent is acetic anhydride. In carrying out the acylation, inert solvent may be employed or excess acylating agent may serve as solvent. An acid-binding agent, e.g. pyridine, is preferably used. Preferred temperatures vary between −10 and 50° C. For acylation of both positions, more stringent conditions may be used, characterized by the presence of a strongly acidic catalyst, e.g. p-toluenesulphonic acid, perchloric acid and the like. If such catalysts are used, in addition to the above-listed acylating agents, enol acylates, preferably esters of "isopropenyl alcohol," e.g. isopropenyl acetate, may also be employed. The considerations involved are well within the scope of one skilled in the art. The method of Step c can also be adapted to a 17β-hydroxy group.

Furthermore, the diester form of Compounds Ic may be selectively saponified employing conventional means, e.g. by treatment with methanolic potassium bicarbonate, to obtain the corresponding 3-hydroxy-17β-acyloxy-substituted Compound Ic. Hence, one skilled in the art can use such knowledge to obtain the desired combination of free hydroxy and acylated positions.

An alternative method of preparing a Compound Ia or Ib wherein Rᵃ is methyl, is to submit a Compound Ic1 to the conditions of Step h employing a methyl-contributing organo-metallic reagent to obtain a Compound Ic wherein Rᵃ is methyl and Rᵇ is a hydrogen atom, to then submit that compound to the conditions of Step f to obtain a 17α-methyl analog of Compound G, i.e. a Compound II, which can then be submitted to Step(s) i to obtain the corresponding Compound Ia or Ib.

Compounds I of this invention are useful because they posses pharmacological properties in animals and many can be used as intermediates for other Compounds I which possess such properties. In particular, those Compounds Ia wherein Rᵃ is ethynyl and Rᵇ is as defined above, have progestational activity and are useful as fertility control agents in birds and mammals and in regulating estrus or the menstrual function in mammals. The progrestational activity of said compounds is indicated by the well-known Clauberg test involving observation of uterine changes in immature female white rabbits given 0.02 to 1 milligram of active agent.

Compounds Iᵃ wherein Rᵃ is methyl and Rᵇ is as defined above, and Compounds Ib wherein Rᵃ is methyl and Rᵇ is as defined above, have anabolic-androgenic activity and are useful in increasing the accumulation of body protein and in reversing negative nitrogen balance in birds and mammals. The anabolic-androgenic activity of said compounds is indicated by well-known test methods, such as by observing the increase in the weight of the ventral prostate glands and of the levator ani muscles of castrated immatuure male white rats, e.g. as described by Eisenberg et al. in J. Pharmacol. Exper. Therap. 99; 38–44 (1950) given 0.02 to 1 milligram of active agent.

Compounds Ic have estrogenic activity and are useful in replacement therapy for estrogen deficiencies, fertility control in birds and mammals and regulation of estrus or the menstrual cycle in mammals. The estrogenic activity as indicated by observing increase in white mouse uterine weight, e.g. as described in Endocrinology 65, 265 (1959) or by observing for cornification of vaginal epithelium of adult female ovariecomized white rats scored according to the method of Biggers and Claringbold, when said animals are given from 0.1 to 10 milligrams of active agent.

The Compounds Ib wherein Rᵃ is ethynyl and Rᵇ is as defined above possess a combination of estrogenic and progestational activity and are therefore useful in controlling fertility of birds and mammals and regulating estrus or the menstrual cycle of mammals. Said estrogenic and progestational activities being indicated by the pertinent methods described above.

These compounds may be combined with a solid or liquid pharmaceutically acceptable carrier or adjuvant in the conventional manner. They may be administered orally or parenterally. The dosage will vary depending upon the mode of administration utilized and the particular compound employed. However, in general, satisfactory results are obtained when Compounds Ia or Ib are administered at a daily dosage of from about 0.01 to 10 milligrams for the above-described pertinent uses and Compounds Ic are administered at a daily dosage of from about 0.1 milligram to 30 milligrams for the above-described pertinent uses. As is appreciated by those skilled in the art, the dosages are independent of body weight. The compounds are preferably administered in soild orally administrable form, e.g. as tablets or capsules.

A representative formulation suitable for oral administration is a tablet prepared by standard tabletting techniques which contains the following:

| Ingredient: | Parts by weight |
|---|---|
| 9α,11 - dimethyl-17α-ethynylestra-4-en-17β-ol-3-one | 0.5 |
| Tragacanth | 2 |
| Lactose | 89 |
| Cornstarch | 5 |
| Talcum | 3 |
| Magnesium stearate | 0.5 |

The following examples are presented as illustrative of the invention. In the examples, all temperatures are centrigrade, and room temperature is 20° to 30° C., unless indicated otherwise.

Compound E are also useful for the same uses and may be administered in the same dosage and manner as described above for Compounds Ic.

EXAMPLE 1

9α,11-dimethyl-3-methoxyestra-1,3,5(10)-trien-17-one

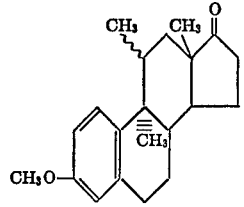

Step A.—17,17-ethylenedioxy-9α,11-dimethyl-3-methoxy-estra-1,3,5(10)-trien-11-ol To a solution of 5.1 g. of 17,17-ethylenedioxy-3-methoxy - 9α-methylestra-1,3,5(10)-trien-11-one in 50 ml. of tetrahydrofuran (THF) stirring at room temperature under nitrogen is added 30 ml. of a 2 M solution of methyl-magnesium bromide in THF over a period of 15 mins. When the addition is complete the clear solution is heated under reflux for 2 hrs. After cooling, it is then poured onto a mixture of ice and saturated aqueous sodium chloride solution and the organic material is extracted three times with 100 ml. of ether. The combined ether extracts are dried over anhydrous sodium sulfate ($Na_2SO_4$), and the solvent is removed in vacuo. The residue is crystallized from methanol to give 17,17-ethylenedioxy-9α-11-dimethyl - 3 - methoxy-estra-1,3,5(10)-trien-11-ol, M.P. 104–106°.

Step B.—9α,11-dimethyl-3-methoxyestra-1,3,5(10)-trien-11-ol-17-one

A solution of 4.2 g. of the product of Step A above, in 40 ml. of glacial acetic acid and 10 ml. of water is heated at 60° for 30 min. It is then cooled and poured onto ice and 10% sodium bicarbonate soluton. The organic material is extracted with ether and after drying over Na$_2$SO$_4$ the ether is removed under reduced pressure. The crystalline residue obtained is recrystallized from ether to give 9α,11 - dimethyl, 3-methoxyestra-1,3,5(10)-trien-11-ol-17-one, M.P. 170–172°.

Step C.—11-acetoxy-9α,11-dimethyl-3-methoxyestra-1,3,5(10)-trien-17-one

A suspension of 600 mg. of calcium hydride (powdered) in 60 ml. of acetic anhydride is stirred and refluxed for ½ hr. To this is added 3 g. of the above 11-hydroxy product of Step B in one portion as a solid and the stirring and refluxing is continued for 65 hrs. The mixture is then cooled and poured onto ice and 10% sodium bicarbonate aqueous solution. When the foaming has subsided, the aqueous mixture is extracted with ether and the ether extract is washed first with fresh 10% bicarbonate solution and then water. After drying over Na$_2$SO$_4$, the ether is removed and the residue is crystallized from ether to give 11 - acetoxy - 9α,11 - dimethyl-3-methoxyestra-1,3,5(10)-trien-17-one, M.P. 174–176°.

Step D.—3-methoxy-11-methylene-9α-methylestra-1,3,5(10)-trien-17-one

The solid 11-acetoxy steroid of Step C, 2.5 g. is heated in a small flask under a vacuum of 15 mm. of mercury at a temperature of 230 to 245°, for about 4 hrs. The flask is then cooled and the residue is dissolved in chloroform. This chloroform solution is filtered through a short column of silica gel and then evaporated to dryness. The residue is crystallized from ether to give 3-methoxy-11-methylene 9α-methylestra-1,3,5(10)-trien-17-one, M.P. 190–191°.

Step E.—9α,11-dimethyl-3-methoxyestra-1,3,5(10)-trien-17-one

A solution of 300 mg. of the product of Step D above, in 20 ml. of methanol containing 50 mg. of a 5% palladium on carbon catalyst in suspension is shaken under an atmosphere of hydrogen until uptake ceases (about 5 hrs.). The suspension is then filtered and the filtrate evaporated to dryness. The residue is crystallized from methanol to give 9α,11-dimethyl-3-methoxyestra-1,3,5(10)-trien-17-one, M.P. 128–130°.

Hard-filled capsules containing 1 mg. of 9α,11-dimethyl-3 - methoxy - 1,3,5(10) - trien - 17 - one and 299 mg. of lactose may be prepared by conventional techniques. Such capsules are useful in estrogen replacement therapy or in controlling fertility, in female warm-blooded animals at a dose of one capsule per day.

EXAMPLE 2

9α,11-dimethyl-17α-ethynylestra-4-en-17β-ol-3-one

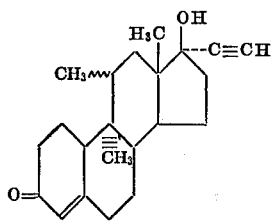

Step A.—9α,11-dimethyl-3-methoxyestra-2,5(10)-dien-17β-ol

A solution of 700 mg. of 9α,11-dimethyl-3-methoxyestra-1,3,5(10)-trien-17-one steroid in 50 ml. of tetrahydrofuran and 70 ml. of tert.-butanol is added to 100 ml. of liquid ammonia under reflux. To this solution is added 2 g. of lithium wire, portion-wise, and the resulting blue solution is stirred under reflux using a Dry Ice condenser for 5 hrs. The ammonia is then allowed to evaporate and 20 ml. of methanol is added dropwise to the residue, followed by 20 ml. of benzene and 20 ml. of saturated aqueous sodium chloride solution. The organic base is separated, washed with water, dried (over Na$_2$SO$_4$) and evaporated to obtain a residue which is crystallized from ether/heaxne, 1/1, to give 9α,11-dimethyl-3-methoxyestra-2,5-(10)-dien-17β-ol, M.P. 147–150°.

Step B.—9α,11-dimethyl-3-methoxyestra-2,5(10)-dien-17-one

A mixture of 800 mg. of 9α,11-dimethyl-3-methoxyestra-2,5-dien-17β-ol, 1 g. of aluminum isopropoxide, 10 ml. of 2-butanone and 10 ml. of benzene is stirred and refluxed for 17 hrs. It is then cooled and poured onto ice and 20 ml. of saturated aqueous sodium bicarbonate solution. The aqueous mixture is extracted with 10 ml. benzene and the organic phase is washed with saturated aqueous sodium chloride solution and dried (Na$_2$SO$_4$). After removal of the solvent, the residue is crystallized from ether to give 9α,11 - dimethyl-3-methoxyestra-2,5(10)-dien-17-one, M.P. 158–160°.

Step C.—9α,11-dimethyl-17α-ethynyl-3-methoxyestra-2,5(10)dien-17β-ol

To a solution of 350 mg. of 9α,11-dimethyl-3-methoxyestra-2,5(10)-dien-17-one in 15 ml. of dimethyl sulfoxide is added 1 g. of lithium acetylide/ethylenediamine complex. The mixture is stirred at room temperature for 4 hrs. under nitrogen and it is then poured onto ice and extracted with 15 ml. methyl chloride. The organic phase is washed with water and dried (Na$_2$SO$_4$). Removal of the solvent gives a non-crystalline residue, shown by infra-red analysis (I.R.) to contain no carbonyl grouping, which is used as such for the subsequent step.

Step D.—9α,11-dimethyl-17α- ethynylestra-4-en-17β-ol-3-one

A solution of 460 mg. of the crude product obtained in Step C above, in 20 ml. of methanol and 2 ml. of 2 N hydrochloric acid is maintained at a temperature of 50° for 1½ hrs. and then concentrated in vacuo. The residue is dissolved in methylene chloride and washed with 10% aqueous sodium bicarbonate solution. After drying over Na$_2$SO$_4$ the solvent is removed and the residue is applied to thick layer chromatography plates by dissolving it in a minimum amount of chloroform. The plates are developed using chloroform/1% methanol, 3 times, and the main band which is strongly absorbing in the ultra-violet region (U.V.) is removed. The steroid is extracted with ethyl acetate and removal of the ethyl acetate gives a residue which is crystallized from ether/hexane, 1/1. Thus is obtained the title compound, M.P. 168–170°.

Repeating the procedure of Step C of this example, but using in place of the 9α,11-dimethyl-3-methoxyestra-2, 5(10)-dien-17-one used therein an equivalent amount of 9α,11 - dimethyl - 3-methoxyestra-1,3,5(10)-trien-17-one, there is analogously obtained 17β-ethynyl-9α,11-dimethyl-3-methoxyestra-1,3,5(10)-trien-17β-ol.

EXAMPLE 3

9α,11,17α-trimethylestra-4-en-17β-ol-3-one

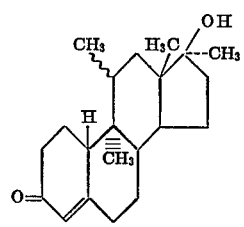

Step A.—3-methoxy-9α,11,17α-trimethylestra-2,5(10)-dien-17β-ol

To a stirred solution of 300 mg. of 9α,11-dimethyl-3-methoxyestra-2,5(10)-dien-17-one in 10 ml. of tetrahydrofuran (THF), is added 5 ml. of a 2 molar solution of methyl magnesium bromide in THF/benzene (1:1). When the exothermic reaction has subsided, the mixture is refluxed for a further 1½ hr. It is then cooled, poured onto ice and 10 ml. of saturated aqueous sodium chloride solution and extracted with ether. The ether solution is washed with water and dried (Na₂SO₄). Removal of the ether gives a non-crystalline residue, showing no carbonyl absorption in the I.R., which is used as such for the next step.

Step B.—9α,11,17α-trimethylestra-4-en-17β-ol-3-one

The non-crystalline steroid obtained in Step A, above, 230 mg. is treated with 10 ml. of methanol and 2 ml. of 2 N hydrochloric acid as described under Step D of Example 2. Similar thick layer chromatography and removal of the U.V. absorbing band gives a residue which is crystallized from ether. Thus is obtained the title compound, M.P. 142–145°.

Repeating the procedure of Step A of this example, but using in place of the 9α,11-dimethyl-3-methoxyestra-2,5(10)-dien-17-one used therein, an equivalent amount of 9α,11-dimethyl - 3 - methoxyestra-1,3,5(10)-trien-17-one, there is analogously obtained 3-methoxy-9α,11-17α-trimethylestra-1,3,5(10)-trien-17β-ol.

Additional exemplary compounds of the invention are:

(a) 9α,11-dimethylestra-1,3,5(10)-trien-3-ol-17-one, (b) 3-acetoxy - 9α,11 - dimethylestra-1,3,5(10)-trien-17-one, (c) 3-acetoxy - 9α,11 - dimethyl - 17α - ethynylestra-1,3,5(10)-trien-17β-ol, (d) 9α,11 - dimethyl - 3 - n - propoxyestra - 1,3,5(10)-trien-17-one, (e) 17β - acetoxy - 9α,11 - dimethyl - 17α - ethynylestra-4-en-3-one, and (f) 9α,11-dimethyl-17α-ethynylestra-5(10)-en-17β-ol-3-one.

What is claimed is:

1. A compound of the formula

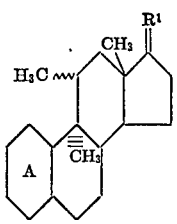

wherein R¹ is oxo, or

wherein Rᵃ is a hydrogen atom, methyl, or ethynyl; and Rᵇ is a hydrogen atom, or alkanoyl having from 2 to 4 carbon atoms; and ring A has the structure

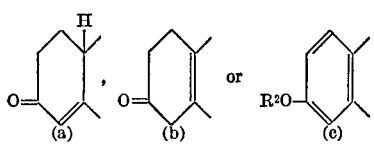

wherein R² is a hydrogen atom, alkyl having from 1 to 4 carbon atoms, or alkanoyl having from 2 to 4 carbon atoms.

provided that when ring A is of type (a) or (b), then R¹ is not oxo or

2. A compound of claim 1, wherein ring A is of type (a), and R¹ is as defined in claim 1.

3. The compound of claim 2 which is 9α,11-dimethyl-17α-ethynylestra-4-en-17β-ol-3-one.

4. The compound of claim 2 which is 9α,11, 17α-trimethylestra-4-en-17β-ol-3-one.

5. A compound of claim 1 wherein ring A is of type (b) and R¹ is as defined in claim 1.

6. A compound of claim 1 wherein ring A is of type (c) and R¹ and R² are as defined in claim 1.

7. A compound of claim 6 wherein R¹ is oxo.

8. The compound of claim 7 which is 9α,11-dimethyl-3-methoxyestra-1,3,5(10)-trien-17-one.

9. A compound of claim 6 wherein R¹ is 17α-ethynyl, 17β-hydroxy.

10. A compound of the formula

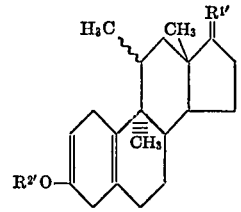

wherein R²' is alkyl having from 1 to 4 carbon atoms; and R¹ is oxo, or

wherein Rᵃ is as defined in claim 1.

11. A compound of claim 10, wherein R¹' is oxo.

12. The compound of claim 11 which is 9α,11-dimethyl-3-methoxyestra-2,5(10)-dien-17-one.

13. A compound of claim 10 wherein R¹ is

14. The compound of claim 13 which is 9α,11-dimethyl-3-methoxyestra 2,5(10)-dien-17β-ol.

15. A compound of claim 10 wherein R¹ is

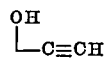

16. The compound of claim 15 which is 9α,11-dimethyl-17α-ethynyl-3-methoxyestra-2,5(10)-dien-17β-ol.

17. A compound of the formula

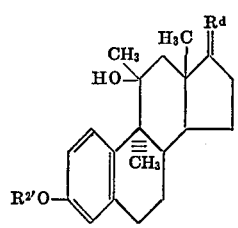

wherein R² is as defined in claim 10, and Rᵈ is oxo or Kt where Kt is

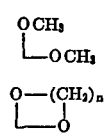

wherein n is 2 or 3.

18. A compound of claim 17, wherein Rᵈ is oxo.

19. The compound of claim 18 which is 9α,11-dimethyl-3-methoxyestra-1,3,5(10-trien-11-ol-17-one.

20. A compound of claim 17, wherein Rᵈ is Kt.

21. The compound of claim 20 which is 9α,11-dimethyl-17,17-ethylenedioxy-3-methoxyestra-1,3,5(10)-trien-11-ol.

22. A compound of the formula

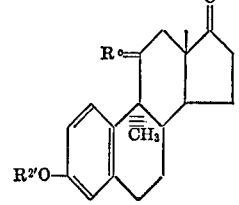

wherein R²' is as defined in claim 10, and R° is

   or   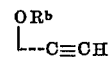

23. A compound of claim 22 wherein R°

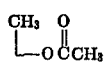

24. The compound of claim 23 which is 11-acetoxy-9α,11-dimethyl-3-methoxyestra-1,3,5(10)-trien-17-one.

25. A compound of claim 22 wherein R° is

26. The compound of claim 25 which is 3-methoxy-11-methylene-9α-methylestra-1,3,5(10)-trien-17-one.

27. A compound of claim 1 wherein ring A is of type (a) and R¹ is $$\underset{|}{\overset{OR^b}{C}}{\equiv}CH$$

wherein $R^b$ is as defined in claim 1.

References Cited

UNITED STATES PATENTS

| | | | |
|---|---|---|---|
| 3,299,108 | 1/1967 | Baran | 260—397.5 |
| 3,377,366 | 4/1968 | Baran | 260—397.45 |
| 3,418,327 | 12/1968 | Buzby et al. | 260—397.4 |
| 3,465,010 | 9/1969 | Baran | 260—397.5 |
| 3,541,067 | 11/1970 | Bergstrom | 260—397.45 |
| 3,652,606 | 3/1972 | Baran et al. | 260—397.5 |
| 3,655,652 | 4/1972 | Coombs et al. | 260—239.55 |

HENRY A. FRENCH, Primary Examiner

U.S. Cl. X.R.

260—397.45, 397.5; 424—243